US012687879B2

(12) United States Patent
Long et al.

(10) Patent No.: US 12,687,879 B2
(45) Date of Patent: Jul. 21, 2026

(54) HYBRID PROPULSION SYSTEM COCKPIT INTERFACE

(71) Applicants: Rolls-Royce Corporation, Indianapolis, IN (US); Rolls-Royce Deutschland Ltd & Co KG, Blankenfelde-Mahlow (DE)

(72) Inventors: Stephen Andrew Long, Indianapolis, IN (US); David Virgil Kopeschka, Indianapolis, IN (US); Michael P. Dougherty, Indianapolis, IN (US); Mark Ian McLaren, Blankenfelde-Mahlow (DE)

(73) Assignees: Rolls-Royce Corporation, Indianapolis, IN (US); Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 11 days.

(21) Appl. No.: 18/420,620

(22) Filed: Jan. 23, 2024

(65) Prior Publication Data

US 2024/0166361 A1 May 23, 2024

Related U.S. Application Data

(63) Continuation of application No. 17/174,874, filed on Feb. 12, 2021, now Pat. No. 11,905,026.

(51) Int. Cl.
| | |
|---|---|
| *G05G 1/04* | (2006.01) |
| *B64D 31/04* | (2006.01) |
| (Continued) | |

(52) U.S. Cl.
CPC .............. *G05G 1/04* (2013.01); *B64D 31/04* (2013.01); *B64D 31/18* (2024.01); *B64D 35/025* (2024.01);
(Continued)

(58) Field of Classification Search
CPC ...... B64D 31/04; B64D 35/025; B64D 31/18; B64D 43/00; G05B 19/042;
(Continued)

(56) References Cited

U.S. PATENT DOCUMENTS

| | | | | |
|---|---|---|---|---|
| 11,333,085 B2 * | 5/2022 | Janik | ....................... | F02D 25/00 |
| 11,884,412 B2 * | 1/2024 | Mark | .................... | B64D 31/06 |

(Continued)

FOREIGN PATENT DOCUMENTS

| | | | | | |
|---|---|---|---|---|---|
| CA | 2643878 A1 * | 5/2010 | ............. | B63H 21/17 |
| CA | 2865632 C * | 1/2020 | .......... | B60L 11/1809 |

(Continued)

OTHER PUBLICATIONS

"Bell 407GX," Bell Helicopter, Product Specification, Feb. 2013, 53 pp.

(Continued)

*Primary Examiner* — Assres H Woldemaryam
(74) *Attorney, Agent, or Firm* — Shumaker & Sieffert, P.A.

(57) ABSTRACT

An example system includes a throttle control for managing power in a hybrid propulsion system that includes an electrical propulsion unit configured to operate using electrical energy sourced from an electrical energy storage system (ESS) and/or one or more electrical generators, the throttle control comprising: a control lever movable through a plurality of positions, the plurality of positions including: a regeneration position; an off position; a maximum electric only position; a maximum continuous dual source position; and a maximum non-continuous dual source position.

15 Claims, 9 Drawing Sheets

(51) Int. Cl.

| | |
|---|---|
| *B64D 31/18* | (2024.01) |
| *B64D 35/025* | (2024.01) |
| *G05B 19/042* | (2006.01) |
| *G05G 1/01* | (2008.04) |
| *G05G 5/00* | (2006.01) |
| *G05G 5/03* | (2008.04) |
| *G05G 5/06* | (2006.01) |

(52) U.S. Cl.
CPC ............. *G05B 19/042* (2013.01); *G05G 1/01* (2013.01); *G05G 5/005* (2013.01); *G05G 5/03* (2013.01); *G05G 5/06* (2013.01); *G05B 2219/23258* (2013.01); *G05G 2505/00* (2013.01)

(58) Field of Classification Search
CPC .. G05B 2219/23258; G05G 1/01; G05G 1/04; G05G 5/005; G05G 5/03; G05G 5/06; G05G 2505/00; G05G 5/065; Y02T 50/60
See application file for complete search history.

(56) References Cited

U.S. PATENT DOCUMENTS

| | | | | |
|---|---|---|---|---|
| 2010/0125383 | A1* | 5/2010 | Caouette | ................... B63J 3/00 701/21 |
| 2016/0236790 | A1 | 8/2016 | Knapp et al. | |
| 2019/0382123 | A1* | 12/2019 | Schwarz | ................ B64D 31/06 |
| 2020/0277063 | A1* | 9/2020 | Thomassin | ............ B64D 27/06 |
| 2020/0290742 | A1* | 9/2020 | Kumar | .................... B64D 27/10 |
| 2021/0101691 | A1* | 4/2021 | Mark | ..................... B64D 45/00 |
| 2021/0245854 | A1 | 8/2021 | Okland | |
| 2022/0258871 | A1 | 8/2022 | Long et al. | |

FOREIGN PATENT DOCUMENTS

| | | | | | |
|---|---|---|---|---|---|
| CA | 3132288 | A1 | * | 9/2020 | ............. B64D 27/06 |
| EP | 3604128 | A1 | * | 2/2020 | ............. B64C 19/02 |
| EP | 3713077 | A1 | * | 9/2020 | ............. F02B 63/042 |

OTHER PUBLICATIONS

"Raptor Aircraft Hybrid," retrieved from www.raptor-aircraft.com/hybrid.html on Jun. 19, 2020, 2 pp.

Boric, "Hypstair: Most Powerful Hybrid Electric Powertrain Powers Up," Aviation Pros, Jul. 14, 2016, 14 pp.

Innocenti et al., "Design of an All-Electric Propulsion System and Control Management for a General Aviation Aircraft," AIAA Atmospheric Flight Mechanics Conference, Aug. 10-13, 2009, 17 pp.

Notice of Allowance from U.S. Appl. No. 17/174,874 dated Oct. 12, 2023, 8 pp.

\* cited by examiner

HYBRID PROPULSION SYSTEM COCKPIT INTERFACE

This application is a continuation of U.S. patent application Ser. No. 17/174,874, filed 12 Feb. 2021, the entire contents of which is incorporated herein by reference.

TECHNICAL FIELD

This disclosure relates to hybrid propulsion systems.

BACKGROUND

A gas turbine engine is a type of internal combustion engine that may be used to power an aircraft, another moving vehicle, or an electric generator. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive the compressor, a propulsor, other devices, and loads including an electric generator. The propulsor may use the energy from the rotating shaft to provide propulsion for the system.

SUMMARY

In general, this disclosure describes pilot interfaces for hybrid propulsion systems that enable vehicles to be propelled using combinations of electrical motors and combustion motors (e.g., thermodynamic engines such as gas turbine engines). The one or more the combustion motors may provide mechanical energy to operate one or more electrical generators, and the electrical motors may utilize electrical power generated by the electrical generators to operate one or more propulsors. In some examples, a hybrid propulsion system includes one or more generators and one or more energy storage systems (ESS), such as a battery, configured to output electrical energy onto one or more electrical busses. One or more electrical machines may be configured to drive a respective propulsor of one or more propulsors using electrical energy received from at least one of the one or more electrical busses. In some examples, the one or more ESS are configured to additionally receive electrical energy from the one or more electrical busses, for example, to charge the one or more ESS. In some examples, a controller may be configured to receive an ESS output limit, such as a power share request, and determine how much electrical power to be used to propel a vehicle is sourced via the one or more ESS and the one or more generators based on the ESS output limit and the power required. A pilot interface may provide pilots or other operators with means to monitor and/or control the various components of the vehicle (e.g., combustion motors, generators, electrical machines, ESSs, electrical busses, etc.). The pilot interface may include various switches, toggles, levers, dials, displays, touch-screens, indicator lights, and the like.

As one example, a system includes a throttle control for managing power in a hybrid propulsion system that includes an electrical propulsion unit configured to operate using electrical energy sourced from an electrical energy storage system (ESS) and/or one or more electrical generators. In some examples, the throttle control includes a control lever movable through a plurality of positions, the plurality of positions including: a regeneration position; an off position;

a maximum electric only position; a maximum continuous dual source position; and a maximum non-continuous dual source position.

As another example, an airframe includes a first electrical energy storage system (ESS) connected to a first electrical bus; a second ESS connected to a second electrical bus; a combustion motor configured to provide rotational mechanical energy to a first generator and a second generator, the first generator configured to convert the rotational mechanical energy into electrical energy for output onto the first electrical bus and the second generator configured to convert the rotational mechanical energy into electrical energy for output onto the second electrical bus; a plurality of electrical propulsion units comprising: a first set of electrical propulsion units connected to the first electrical bus; and a second set of electrical propulsion units connected to the second electrical bus; and a pilot interface comprising a respective control lever for each electrical propulsion unit of the plurality of electrical propulsion units, each of the respective control levers movable through a plurality of positions, the plurality of positions including: a regeneration position; an off position; a maximum electric only position; a maximum continuous dual source position; and a maximum non-continuous dual source position.

The details of one or more examples are set forth in the accompanying drawings and the description below. Other features, objects, and advantages will be apparent from the description and drawings, and from the claims.

DETAILED DESCRIPTION

Vehicles may include combustion motors that convert chemical potential energy (e.g., fuel) to propulsion and/or to electrical power. In addition to combustion motors, vehicles may include electrical machines to create propulsion. A vehicle that includes both combustion motors and electrical machines may be referred to as a hybrid vehicle. The motors in hybrid vehicles may be configured as series, parallel, or series-parallel.

Combustion motor(s) may not directly provide power to propulsors, but instead may provide power in the form of rotational mechanical energy to one or more electric generators. The generator(s) may provide electrical power to the electrical machine(s), which in turn provide power (i.e., rotational mechanical energy) to one or more propulsors. In some examples, a vehicle may include an energy storage system (ESS) capable of storing electrical energy for subsequent use by the electrical machines. The ESS may be charged with electrical energy generated by the generator(s) using mechanical energy from the combustion motor(s), electrical energy received from a source external to the vehicle (e.g., ground power in the case of an aircraft), and/or electrical energy generated by one or more other components of the vehicle. Some other components of the vehicle that may generate electrical energy include, but are not limited to, the electrical machines (e.g., in a descent phase of flight in the case of an aircraft), solar panels, and the like.

Figure 1:
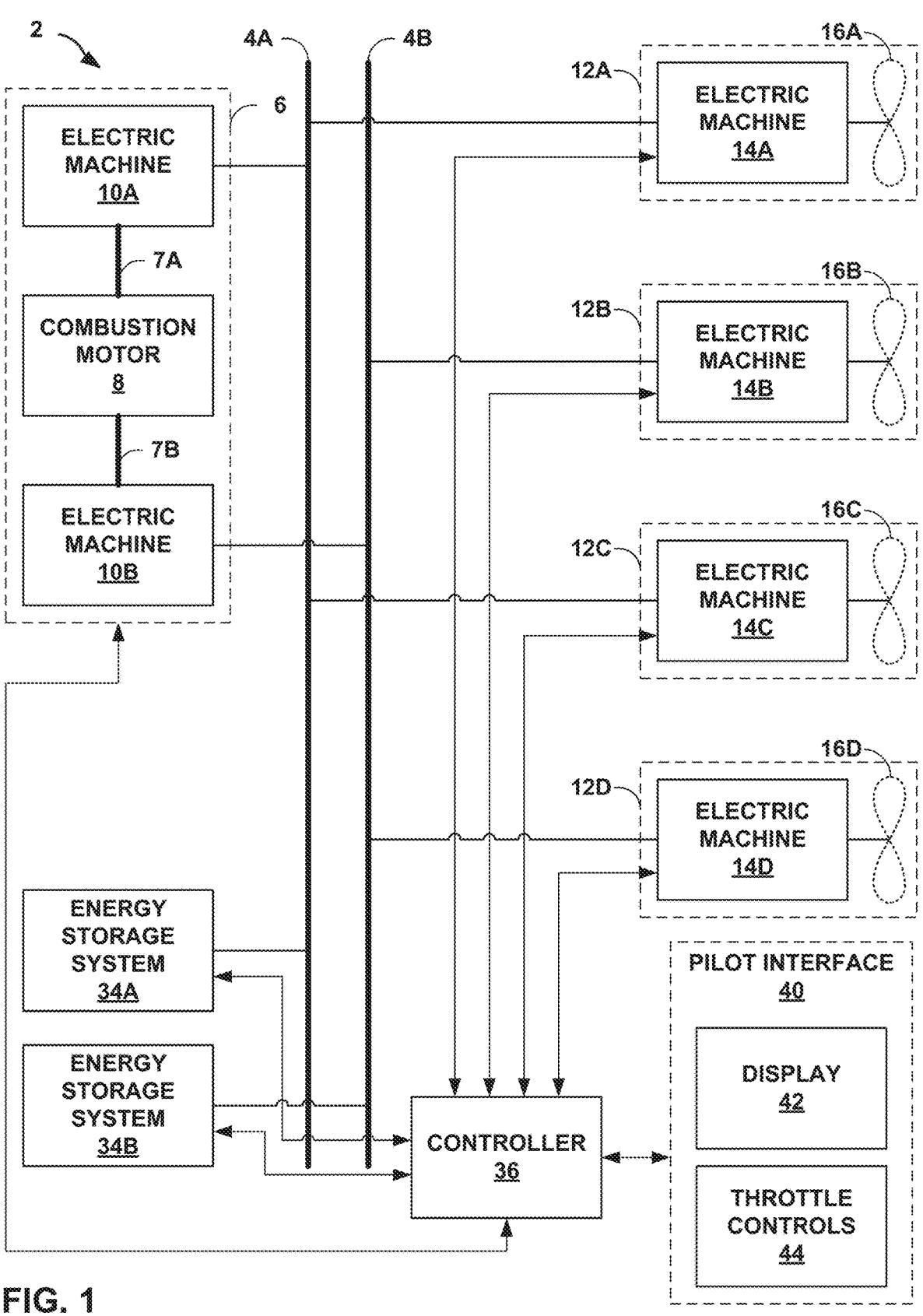
FIG. 1 is a conceptual block diagram illustrating a system 2 that includes a hybrid propulsion system, in accordance with one or more techniques of this disclosure.

FIG. 1 is a conceptual block diagram illustrating a system 2 that includes a hybrid propulsion system, in accordance with one or more techniques of this disclosure. As shown in FIG. 1, system 2 includes electrical busses 4A and 4B (collectively, "electrical busses 4"), power unit 6, propulsion modules 12A-12D (collectively, "propulsion modules 12"), energy storage systems (ESSs) 34A and 34B (collectively, "ESSs 34"), a controller 36, and pilot interface 40. System 2 may be included in, and provide propulsion to, any vehicle, such as air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. System 2 may include additional components not shown in FIG. 1 or may not include some components shown in FIG. 1.

Electrical busses 4 provides electrical power interconnection between various components of system 2. Electrical busses 4 may include any combination of one or more direct current (DC) bus, one or more alternating current (AC) electrical bus, or combinations thereof. As one example, each of electrical busses 4 may include a DC bus configured to transport electrical power amongst an electric machine of power unit 6, an ESS of ESSs 34, and one or more of propulsion modules 12. For instance, electrical bus 4A may transport electrical power amongst electric machine 10A, propulsion modules 12A and 12C, and ESS 34A, and electrical bus 4B may transport electrical power amongst electric machine 10B, propulsion modules 12B and 12D, and ESS 34B.

Power unit 6 provides electrical power for use by various components of system 2. As shown in FIG. 1, each of power unit 6 may include a combustion motor and two associated electrical machines. In particular, power unit 6 includes combustion motor 8 and electric machines 10A and 10B. In operation, combustion motor 8 utilizes fuel to produce rotational mechanical energy, which may be provided to electric machines 10A and 10B via drive shafts 7A and 7B. Electric machine 10A converts the rotational mechanical energy from drive shaft 7A into electrical energy and outputs the electrical energy to electrical bus 4A, and electric machine 10B converts the rotational mechanical energy from drive shaft 7B into electrical energy and outputs the electrical energy to electrical bus 4B. Examples of combustion motor 8 include, but are not limited to, reciprocating, rotary, and gas-turbines.

Power unit 6 may have an output power limit that is less than a peak power or full output power capacity. For instance, power unit 6 may have a peak power output capacity that is greater than a maximum continuous power output capacity. Power unit 6 may be capable of operating at the peak power output capacity for a limited time (e.g., 5 minutes, 10 minutes, 20 minutes, etc.) and may be capable of indefinite operation at the maximum continuous power output capacity.

Propulsion modules 12 convert electrical energy to propulsion. As shown in FIG. 1, each of propulsion modules 12 may include one or more electrical machines and one or more propulsors. For instance, propulsion module 12A includes electrical machine 14A and propulsor 16A, and propulsion module 12D includes electrical machine 14D and propulsor 16D. In operation, propulsion modules 12 may operate in a plurality of modes including, but not limited to, an electric propulsion mode, a regeneration mode, and a neutral mode. As discussed in further detail below, the operating modes of propulsion modules 12 may by controlled by controller 36 based on inputs received via pilot interface 40.

Propulsion modules 12 may be located at various positions on a vehicle. For instance, where system 2 is integrated into an aircraft, propulsion modules 12A and 12B may be attached to a starboard wing and propulsion modules 12C and 12D may be attached to a port wing. As such, each wing may include at least one propulsion module connected to each of electrical busses 4.

When a propulsion module of propulsion modules 12 operates in the electric propulsion mode, an electrical machine of the propulsion module may consume electrical energy received via one of electrical busses 4 and convert the electrical energy to rotational mechanical energy to power a propulsor. For instance, when propulsion module 12A operates in the electric propulsion mode, electrical machine 14A may consume electrical energy from electrical bus 4A and convert the electrical energy to rotational energy to power propulsor 16A. When a propulsion module of propulsion modules 12 operates in the regeneration mode, an electrical machine of the propulsion module converts rotational mechanical energy received from a propulsor of the propulsion module into electrical energy and provides the electrical energy to one of electrical buses 4. When a propulsion module operates in the neutral mode (e.g., a zero torque mode), a propulsor of the propulsion module may reduce its fluid resistance (e.g., feather and/or blend with contours of an airframe).

Each of propulsion modules 12 may have the same or different propulsion capacities. As one example, when operating at peak power, propulsion module 12A may be capable of generating more propulsive power than propulsion module 12B. As another example, when operating at peak power, propulsion module 12A may be capable of generating the same amount of propulsive power as propulsion module 12B. As another example, propulsion module 12B may positioned at an outboard portion of a wing to provide greater yaw control while propulsion module 12A may be positioned at an inboard portion of the wing in order to provide primary propulsion.

Energy storage systems (ESSs) 34 may provide energy storage capacity for system 2. ESSs 34 may include any devices or systems capable of storing energy (e.g., electrical energy). Examples of devices that may be included in ESSs 34 include, but are not limited to, batteries, capacitors, supercapacitors, flywheels, pneumatic storage, and any other device capable of storing electrical energy or energy that may be converted to electrical energy (without combustion). Each of ESSs 34 may be coupled to different busses of electrical buses 4s and may be capable of providing electrical energy to said busses and receiving electrical energy (e.g., for charging) from said busses. For instance, ESS 34A may be coupled to electrical bus 4A and ESS 34B may be coupled to electrical bus 4B.

In some examples, ESS 34 may include multiple energy storage systems. For instance, ESS 34 may include a first energy storage system configured to store and provide electrical energy for propulsion and a second energy storage system configured to store and provide electrical energy for other systems, such as avionics and/or hotel loads. In some examples, ESS 34 may include a single energy storage system. For instance, ESS 34 may include a single energy storage system configured to store and provide electrical energy for propulsion and other systems.

In some examples, one or more components of ESS 34 may be swappable. For example, one or more batteries of ESS 34 may be swappable while an aircraft including system 2 is on the ground. As such, the aircraft may be quickly able to return to a fully charged state without the need to charge the batteries on the ground.

Controller 36 may control the operation of one or more components of system 2. For instance, controller 36 may control the operation of electrical bus 4, power units 6, propulsion modules 12, and ESS 34. In some examples, controller 36 may include a single controller that controls all of the components. In other examples, controller 36 may include multiple controllers that each control one or more components. Where controller 36 includes multiple controllers, the controllers may be arranged in any configuration. As one example, controller 36 may include a separate controller for each module type. For instance, controller 36 may include a first controller that controllers power unit 6 (e.g., a FADEC) and a second controller that controls propulsion modules 12. As another example, controller 36 may include a separate controller for each module, or sub-module, within the module types. For instance, controller 36 may include a separate controller for each of propulsion modules 12.

In some examples, controller 36 may determine the sourcing of electrical power to meet a power demand, for example, a request for power for an amount of power to be used to propel a vehicle. In some examples, controller 36 may receive a power demand specifying an amount of power to be used to propel a vehicle. Controller 36 may determine a first amount of power to be sourced from ESS 34 and second amount of power to be sourced from a generator, e.g., power unit 6. Controller 36 may determine the first and second amounts of power.

Controller 36 may comprise any suitable arrangement of hardware, software, firmware, or any combination thereof, to perform the techniques attributed to controller 36 herein. Examples of controller 36 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 36 includes software or firmware, controller 36 further includes any necessary hardware for storing and executing the software or firmware, such as one or more processors or processing units. In some examples, controller 36 may be a full authority digital engine controller (FADEC).

In general, a processing unit may include one or more microprocessors, DSPs, ASICs, FPGAs, or any other equivalent integrated or discrete logic circuitry, as well as any combinations of such components. Although not shown in FIG. 1, controller 36 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 36 (e.g., may be external to a package in which controller 36 is housed).

Pilot interface 40 may include various components to enable a pilot or other operator to monitor and/or control operation of various components of system 2. As shown in the example of FIG. 1, pilot interface 40 may include display 42 and throttle controls 44.

Throttle controls 44 may enable the pilot or other operator to control an amount of thrust provided by propulsion modules 12. For instance, throttle controls 44 may include, for each of propulsion modules 12, a respective control lever movable through a plurality of positions (e.g., that correspond to operating modes). As one example, the plurality of positions may include a regeneration position; an off position; a maximum electric only position; a maximum continuous dual source position; and a maximum non-continuous dual source position.

Responsive to determining that the control lever corresponding to a particular propulsion module is in the regeneration position, controller 36 may cause an ESSs connected to the same electrical bus as the particular propulsion module to charge using electrical energy sourced from the particular propulsion unit. As one example, when the control lever corresponding to propulsion unit 12A is in the regeneration position, controller 36 may cause propulsion unit 12A to operate in the regeneration mode and cause ESS 34A to charge using electrical energy sourced from electrical bus 4A. As another example, when the control lever corresponding to propulsion unit 12B is in the regeneration position, controller 36 may cause propulsion unit 12B to operate in the regeneration mode and cause ESS 34B to charge using electrical energy sourced from electrical bus 4B.

Responsive to determining that the control lever corresponding to a particular propulsion module is in the off position, controller 36 may cause the particular propulsion module to provide zero torque to a propulsor of the particular propulsion unit. As one example, when the control lever corresponding to propulsion unit 12A is in the off position, controller 36 may cause propulsion unit 12A to operate in the neutral mode.

Responsive to determining that the control lever corresponding to a particular propulsion module is in the maximum electric only position, controller 36 may cause the particular propulsion unit to provide torque to a propulsor of the particular propulsion unit using electrical energy sourced from an electrical bus coupled to the particular propulsion unit and cause an ESS coupled to the electrical bus to output electrical energy onto the electrical bus. As one example, when the control lever corresponding to propulsion unit 12A is in the maximum electric only position, controller 36 may cause propulsion unit 12A to operate in the electric propulsion mode in which electric machine 14A provides torque to propulsor 16A using electrical energy sourced from electrical bus 4A.

In some examples, when the control levers for all propulsion units connected to a particular electrical bus are set to the maximum electric only position, controller 36 may cause a generator connected to the particular electrical bus to refrain from outputting electrical energy onto the particular electrical bus. As one example, where the control levers for propulsion units 12A and 12C are in the maximum electric only position, controller 36 may cause electric machine 10A of power unit 6 to refrain from outputting electrical energy onto electrical bus 4A.

Responsive to determining that the control lever corresponding to a particular propulsion module is in the maximum continuous dual source position, controller 36 may cause the particular propulsion unit to provide torque to a propulsor of the particular propulsion module using electrical energy sourced an electrical bus coupled to the particular propulsion unit and cause an ESS and electrical generator coupled to the electrical bus to output electrical energy onto the electrical bus (e.g., without being subject to a time limit) As one example, where the control lever for propulsion unit 12A is in the maximum continuous dual source position, controller 36 may cause propulsion unit 12A to operate in the electric propulsion mode in which electric machine 14A provides torque to propulsor 16A using electrical energy sourced from electrical bus 4A, ESS 34A to output electrical energy onto electrical bus 4A, and electric machine 10A to output electrical energy onto electrical bus 4A. The ratio of power provided by ESS 34A and electric machine 10A may be based on a power share request.

Responsive to determining that the control lever corresponding to a particular propulsion module is in the maximum non-continuous dual source position, controller 36 may cause the particular propulsion unit to provide torque to a propulsor of the particular propulsion module using electrical energy sourced from an electrical bus coupled to the particular propulsion unit and cause an ESS and electrical generator coupled to the electrical bus to output electrical energy onto the electrical bus (e.g., while being subject to a time limit) As one example, where the control lever for propulsion unit 12A is in the maximum continuous dual source position, controller 36 may cause propulsion unit 12A to operate in the electric propulsion mode in which electric machine 14A provides torque to propulsor 16A using electrical energy sourced from electrical bus 4A, ESS 34A to output electrical energy onto electrical bus 4A, and electric machine 10A to output electrical energy onto electrical bus 4A. As discussed above, the ratio of power provided by ESS 34A and electric machine 10A may be based on a power share request.

In some examples, pilot interface 40 may output an indication of how long power unit 6 may continue to support operation of propulsion units 12 in the maximum non-continuous dual source position (e.g., remaining time). For instance, controller 36 may cause pilot interface 40 to display a stopwatch, timer, or clock in response to a temperature of power unit 6 exceeding a threshold temperature and begin a countdown to aid in the pilot knowing when to reduce power demand. The temperature of power unit 6 can also be reduced uniquely in a hybrid application by applying battery power to reduce the fuel (and therefore temperature) of power unit 6.

In some examples, pilot interface 40 may output an indication of how long ESS 34 may continue to support operation of propulsion units 12 at the current settings (e.g., remaining time). For instance, controller 36 may cause pilot interface 40 to display a stopwatch, timer, or clock.

Figure 2:
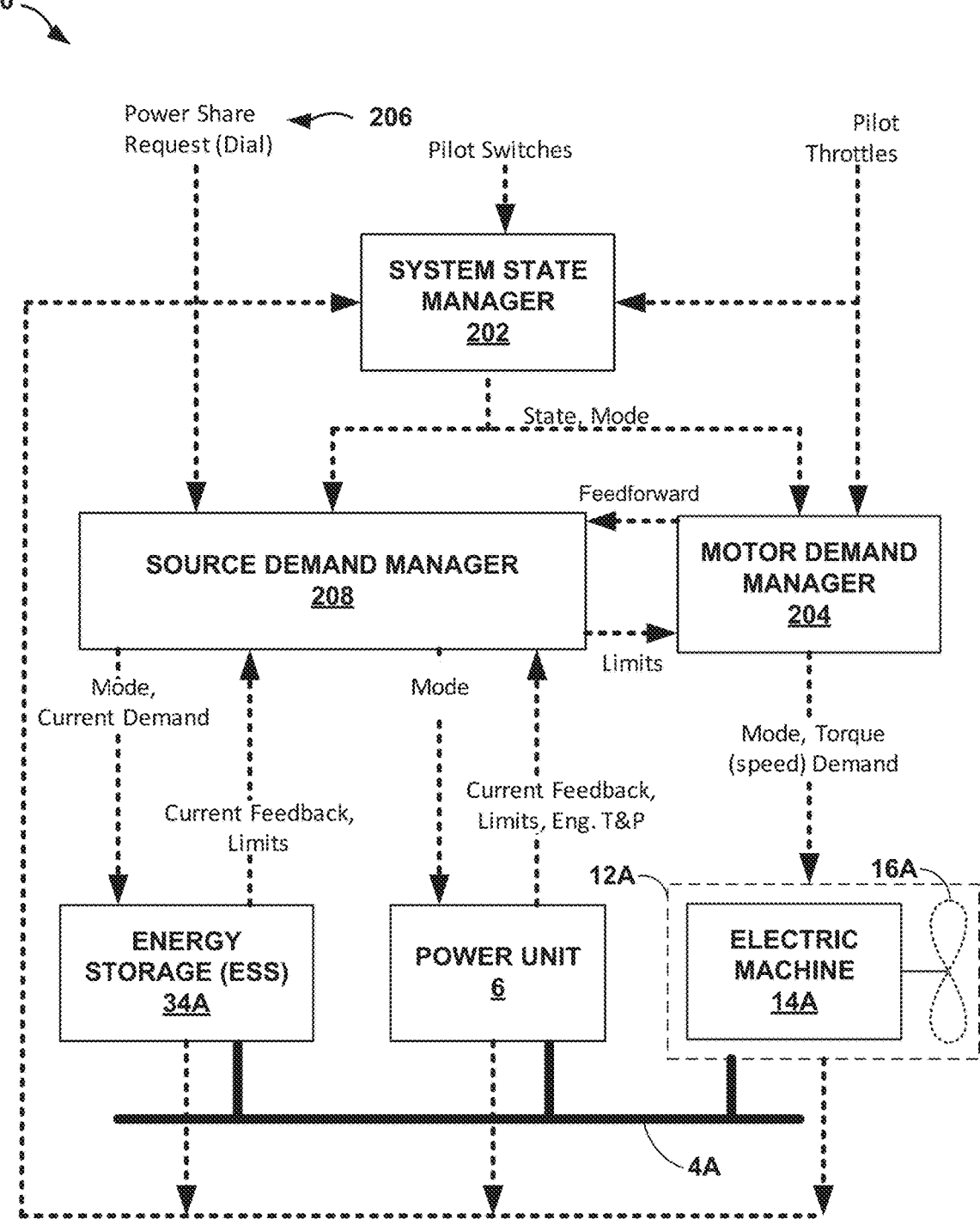
FIG. 2 is a conceptual block diagram illustrating a system 200 that includes a hybrid propulsion system and a controller 36, in accordance with one or more techniques of this disclosure.

FIG. 2 is a conceptual block diagram illustrating a system 200 that includes a hybrid propulsion system and a controller 36, in accordance with one or more techniques of this disclosure. System 200 may represent one example of system 2 of FIG. 1 that includes controller 36, power unit 6, ESS 34A, propulsion module 12A, and electrical bus 4A providing an electrical power interconnection between power unit 6, ESS 34A, and propulsion module 12A. System 200 may also include system state manager 202, motor demand manager 204, and source demand manager 208, functions which may be performed by a controller such as controller 36 of FIG. 1. Although the example system 200 illustrated in FIG. 1 shows a single ESS 34A, power unit 6, and propulsion module 12A, in some examples system 200 may include one or more of each of ESS 34A, power unit 6, and propulsion module 12A.

System state manager 202 provides information to one or more controllers and/or system managers relating to the state and mode of a plurality of control switches and settings of various vehicle systems. For example, system state manager 202 may receive throttle input relating to propulsion, and output information relating to throttle input to source demand manager 208 and motor demand manager 204, such as the state and mode of throttle input. In some examples, system state manager 202 may receive switch input such as user input relating to one or more systems of the vehicle. For example, system state manager 202 may receive switch input relating to hotel loads, communications, mechanical systems and the like, and may output information relating to the received input to the appropriate system and/or controller controlling the appropriate system. In some examples, system state manager 202 may receive feedback from various components of system 200, such as ESS 34A, power unit 6, and propulsion module 12A. For example, system state manager 202 may receive information relating to device status, state, contactor status, speed, voltage, and the like.

Motor demand manager 204 provides information and control commands to propulsion module 12A. For example, motor demand manager 204 may receive information relating to throttle input including throttle state and mode from system state manager 202 and output information, such as propulsion module 12A mode, and control commands such as a specified torque and/or speed of electric machine 14A. In some examples, motor demand manager 204 may receive throttle input directly and output information and commands. In some examples, motor demand manager 204 may receive information from one or more source demand managers 208, such as limits on propulsion module 12A, and output information and commands.

Source demand manager 208 may control the operation of one or more components of system 200 and system 2, as described above with respect to FIG. 1. For example, source demand manager 208 may receive input information and commands from system state manager 202, such as one or more states and modes, and other inputs, such as power share request 206. Source demand manager 208 may output information and control commands, such as mode and electrical current demand, to ESS 34A and/or power unit 6. Source demand manager 208 may receive information from ESS 34A and/or power unit 6, for example, feedback relating to electrical current, limits of ESS 34A and power unit 6, engine temperatures and pressures, and the like. In some examples, limits of various components of system 200, e.g., ESS 34A, power unit 6, propulsion module 12A, may include predetermined output limits which may be set and/or changed. Limits may also include the output capability and/or capacity limits of various components of system 200, e.g., the maximum output of ESS 34A and/or power unit 6, which may change depending on environmental conditions, faults and/or fault conditions, material degradation of ESS 34A and/or power unit 6, and the like.

Source demand manager 208 may determine a first amount of power to be sourced from ESS 34A and second amount of power to be sourced from power unit 6 to meet a power demand and/or request for power for an amount of power to be used to propel the vehicle. In some examples, source demand manager 208 may determine a plurality of amounts of power to be sourced from a plurality of ESS's and power units. In some examples, source demand manager 208 may determine the first and second amounts of power based on any or all of the power demand, power share request 206, and feedback information including electrical current feedback and limits of various components of system 200, e.g., ESS 34A, power unit 6, and propulsion module 12A. Source demand manager 208 may output the determined first amount of power to ESS 34A and the determined second amount of power to power unit 6. In some examples, source demand manager 208 may output limits to motor demand manager 204 and may receive feedforward information such as throttle position and/or motor demand from motor demand manager 204.

Power share request 206 may provide a criterion for sourcing of the electrical power of system 200 and setting output limits for ESS 34A and/or power unit 6. For example, the amount of power of a power demand supplied by each of ESS 34A and power unit 6 may be determined based on power share request 206. In some examples, a predetermined ESS limit may be determined based on power share request 206, and in some examples the predetermined ESS limit may be power share request 206. In some examples, power share request 206 may correspond to a percentage of a fixed power demand, e.g., a fixed request for power and/or a total power required. In some examples, source demand manager 208 may receive a plurality of power share requests 206, for example, a power share request for each of a plurality of ESS's and power units. In some examples, a user may input a power share request, for example, via a dial, lever, touch screen input, typed input, or any other appropriate means. For instance, a pilot interface, such as pilot interface 40 of FIG. 1, may include a power share control (e.g., a dial) configured to receive an input specifying the power share request (e.g., a requested power source distribution between the ESS and the one or more electrical generators). In other examples, a power share request may be determined via a control algorithm and/or a schedule.

Figure 3:
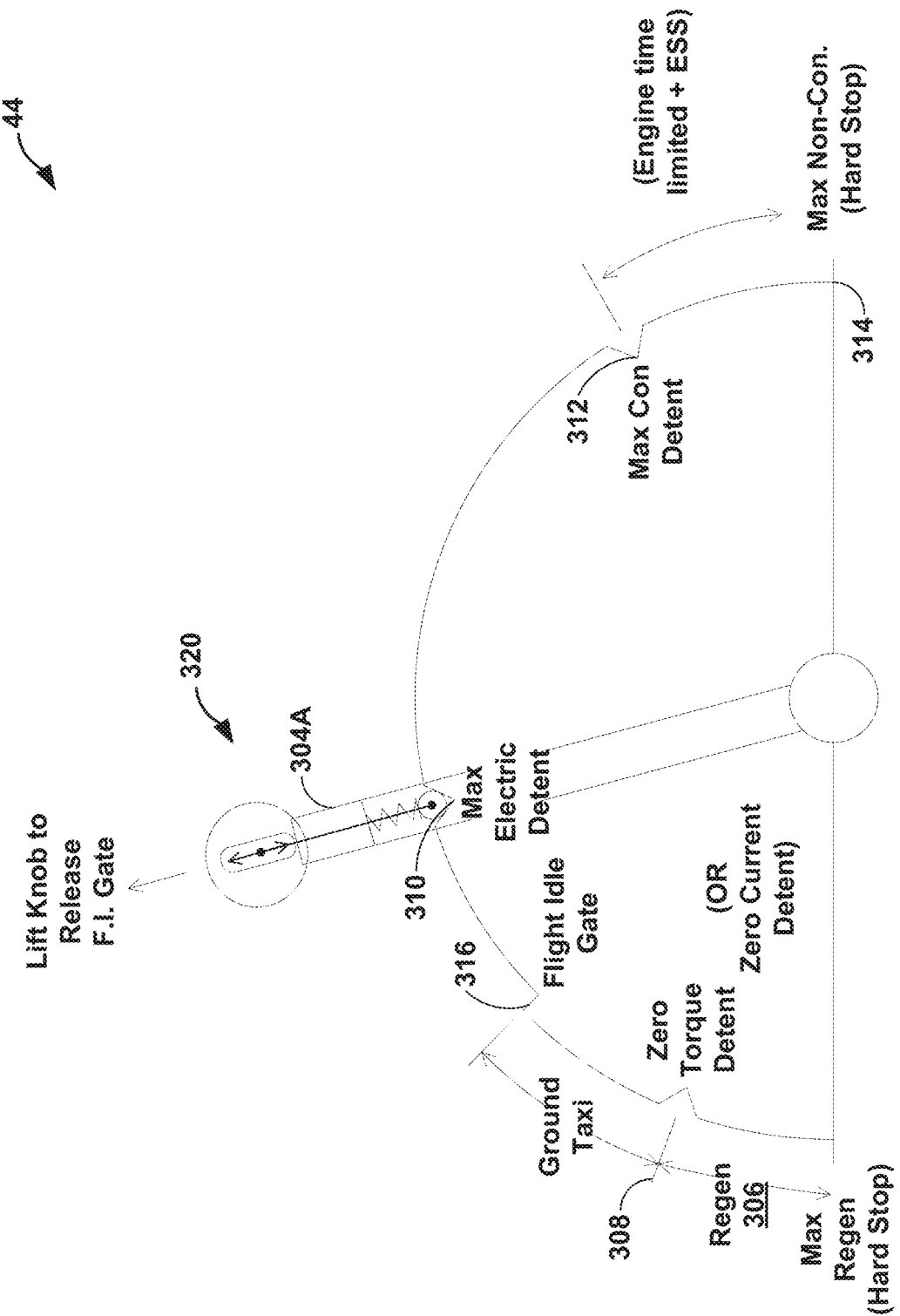
FIG. 3 is a side view of a throttle control of a hybrid-electrical vehicle, in accordance with one or more aspects of this disclosure.

FIG. 3 is a side view of a throttle control of a hybrid-electrical vehicle, in accordance with one or more aspects of this disclosure. As shown in FIG. 3, throttle controls 44 may include control lever 304A that is movable through a plurality of positions. The plurality of positions may include regeneration position 306, off position 308, maximum electric only position 310, maximum continuous dual source position 312, and maximum non-continuous dual source position 314. Control lever 304A may be movable through the plurality of positions in sequence. As shown in the example of FIG. 3, one example sequence is regeneration position 306, off position 308, maximum electric only position 310, maximum continuous dual source position 312, and maximum non-continuous dual source position 314.

In some examples, the throttle control may include detents at one or more of the plurality of positions. For instance, throttle controls 44 may include detents at one or more of: the off position, the maximum electric only position, and the maximum continuous dual source position. Moving the control lever across a detent may provide a pilot or other operator with tactile feedback (e.g., as their gaze may not be directed to the control lever when operating the control lever). For instance, control lever 304A may include mechanical mechanism 320 that provides tactile feedback to a user of the control lever when the control lever is moved into, or out of, a detent.

The plurality of positions may include additional positions or may omit some of the aforementioned positions. For instance, the plurality of positions may further include flight idle position 316, which may be in the sequence between off position 308 and maximum electric only position 310. As shown in FIG. 3, flight idle position 316 may include a gate such that control lever 304A is not movable from maximum electric only position 310 to off position 308 without actuation of mechanical mechanism 320 (e.g., lifting of a handle of control lever 304A). In this way, a pilot or operator may be prevented from inadvertently moving control lever 304A from maximum electric only position 310 to off position 308.

Figure 4:
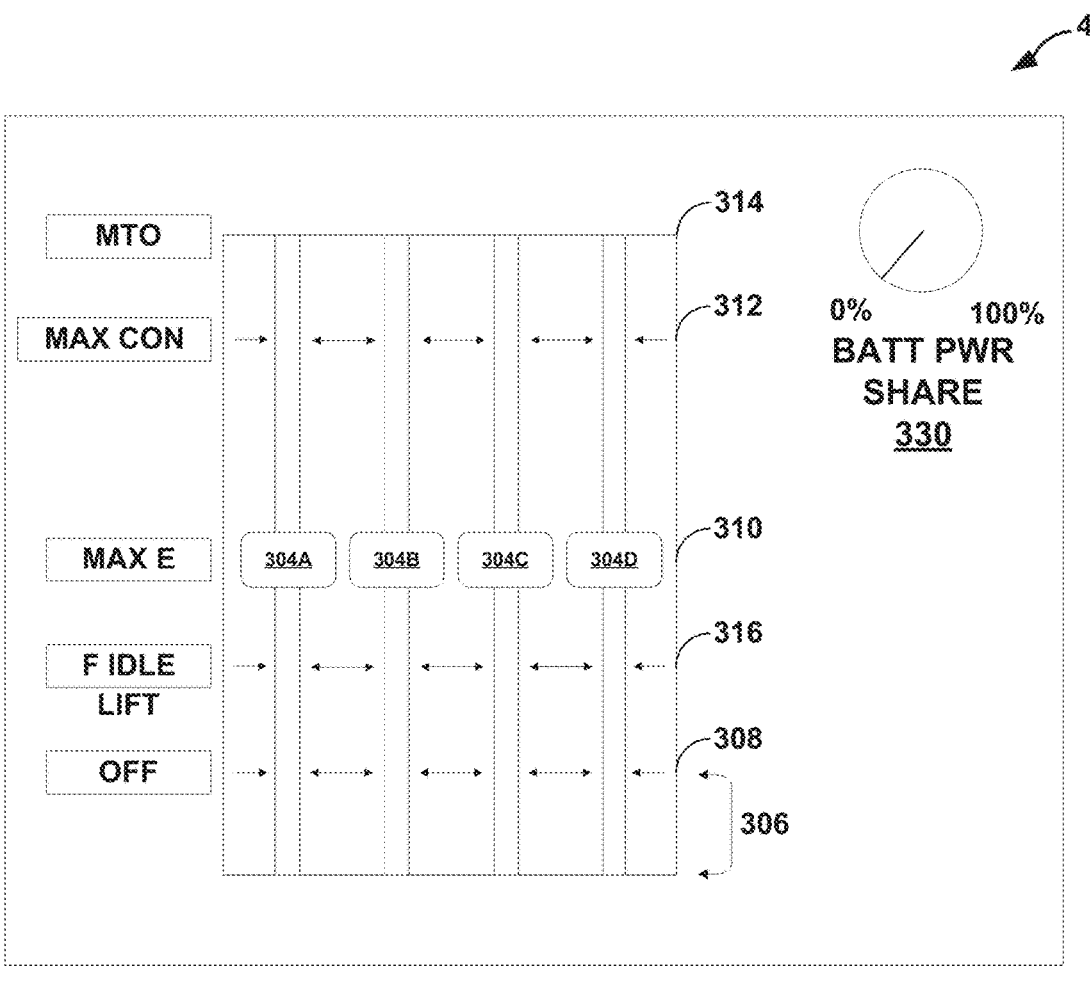
FIG. 4 is a top view of throttle controls of a hybrid-electrical vehicle, in accordance with one or more aspects of this disclosure.

FIG. 4 is a top view of throttle controls of a hybrid-electrical vehicle, in accordance with one or more aspects of this disclosure. As discussed above, throttle controls 44 may include a respective control lever for each propulsion unit. For instance, as shown in FIG. 4, throttle controls 44 may include control levers 304A-304D (collectively, "control levers 304") which may respectively control operation of at least propulsion units 12A-12D of FIG. 1. Each of control levers 304 may be independently movable through the plurality of positions to control a respective electrical propulsion unit of the plurality of electrical propulsion units. For instance, each of control levers 304 may be set at a different position (though they may all be set at a same position). As one example, during takeoff, all of control levers 304 may be set to maximum non-continuous dual source position 314. As another example, during cruise, control levers 304 may be set to similar, yet slightly different, positions between maximum electric only position 310 and maximum continuous dual source position 312.

Figure 5:
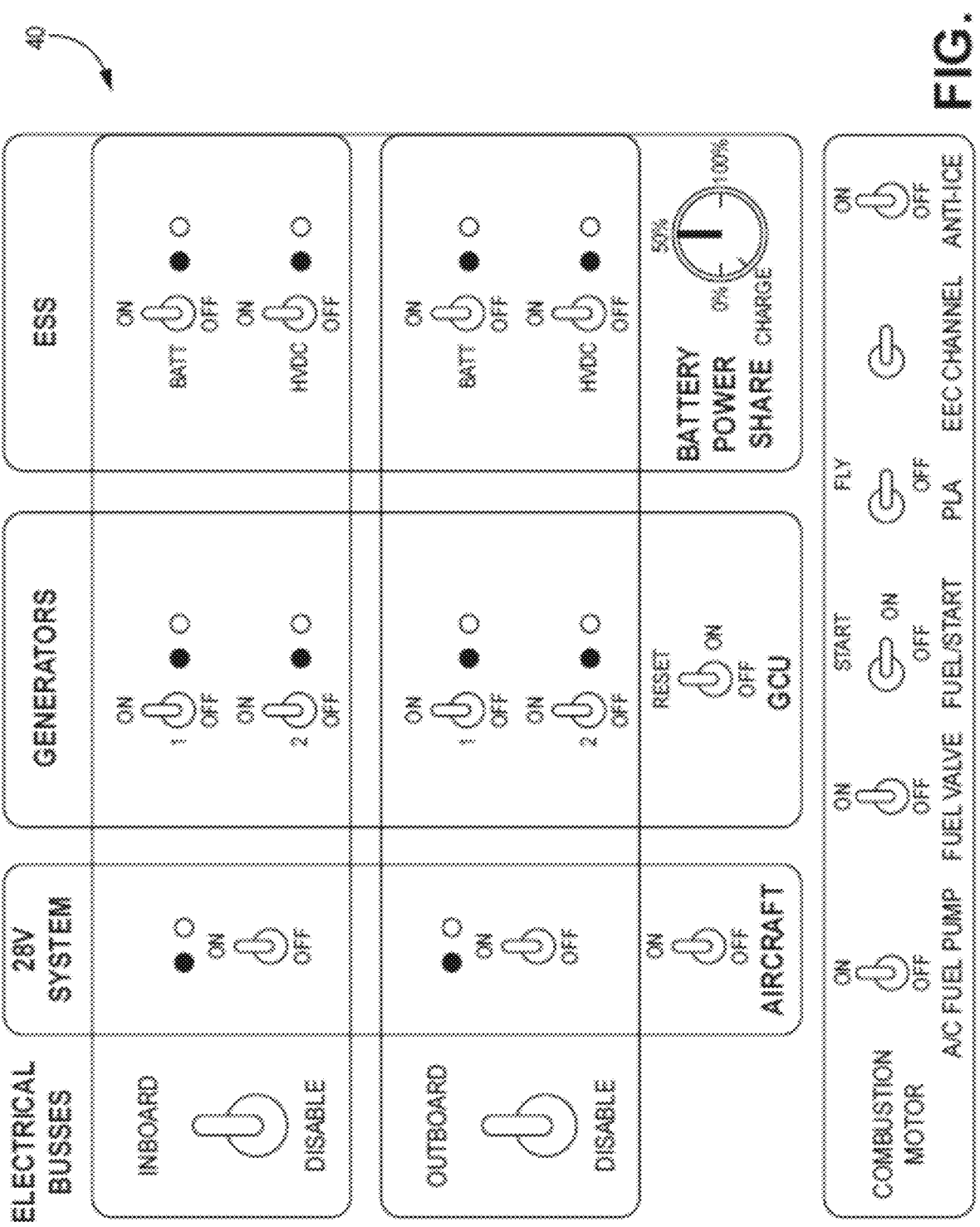
FIG. 5 is a conceptual diagram illustrating controls that may be included in a pilot interface, in accordance with one or more aspects of this disclosure.

FIG. 5 is a conceptual diagram illustrating controls may be included in a pilot interface, in accordance with one or more aspects of this disclosure. As shown in FIG. 5, pilot interface 40 may include controls (e.g., toggle switches) to enable a pilot or other operator to activate and/or deactivate components of system 2. For instance, pilot interface 40 may include controls to enable the pilot to activate or deactivate electrical busses 4, electric machines 10 (e.g., generators including a generator control unit (GCU)), and ESSs 34.

In some examples, the behavior of the switches shown in FIG. 5 may be as follows. When a switch is in the off position, the associated device may be electrically disconnected from electrical bus 4 (e.g., by opening a contactor and/or stopping active gate switching). When the switch is in the on position, the associated device may be enabled to connect and provide power but may not be connected and/or activated until additional criteria are met as determined by a controller (e.g., controller 36 of FIG. 1). The additional criteria may include, but is not limited to, self-checks passed, system checks passed, device is in the correct state/mode, system is in the correct state/mode, sequencing, etc.

Figure 6:
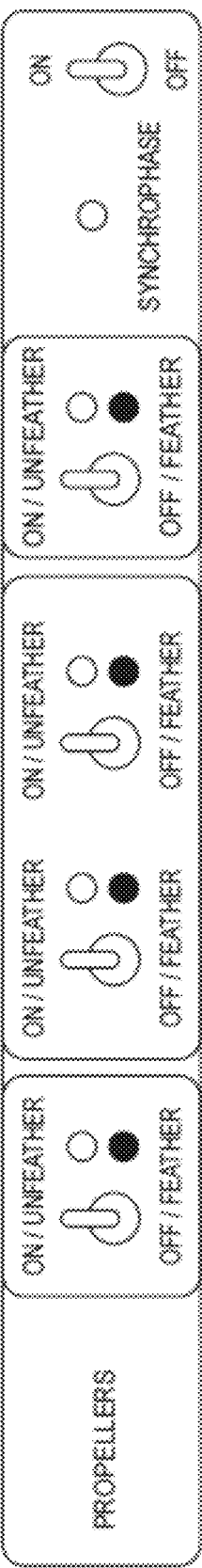
FIG. 6 is a conceptual diagram illustrating controls may be included in a pilot interface, in accordance with one or more aspects of this disclosure.

FIG. 6 is a conceptual diagram illustrating controls may be included in a pilot interface, in accordance with one or more aspects of this disclosure. As shown in FIG. 6, pilot interface 40 may include controls (e.g., toggle switches) to enable a pilot or other operator to activate and/or deactivate components of system 2. For instance, pilot interface 40 may include controls to enable the pilot to adjust operation of propulsion modules 12, including propulsors 16. Some operations of propulsion modules 12 that may be controlled via pilot interface 40 include, but are not limited to, enable/disable, feathering and synchrophase.

In some examples, the behavior of the switches shown in FIG. 6 may be as follows. When a switch is in the off position, the associated propulsion module of propulsion modules 12 may be electrically disconnected from electrical bus 4 (e.g., by opening a contactor and/or stopping active gate switching). When the switch is in the on position, the associated propulsion module of propulsion modules 12 may be enabled to connect and provide power but may not be connected and/or activated until additional criteria are met as determined by a controller (e.g., controller 36 of FIG. 1). The additional criteria may include, but is not limited to, self-checks passed, system checks passed, device is in the correct state/mode, system is in the correct state/mode, sequencing, etc.

Figure 7:
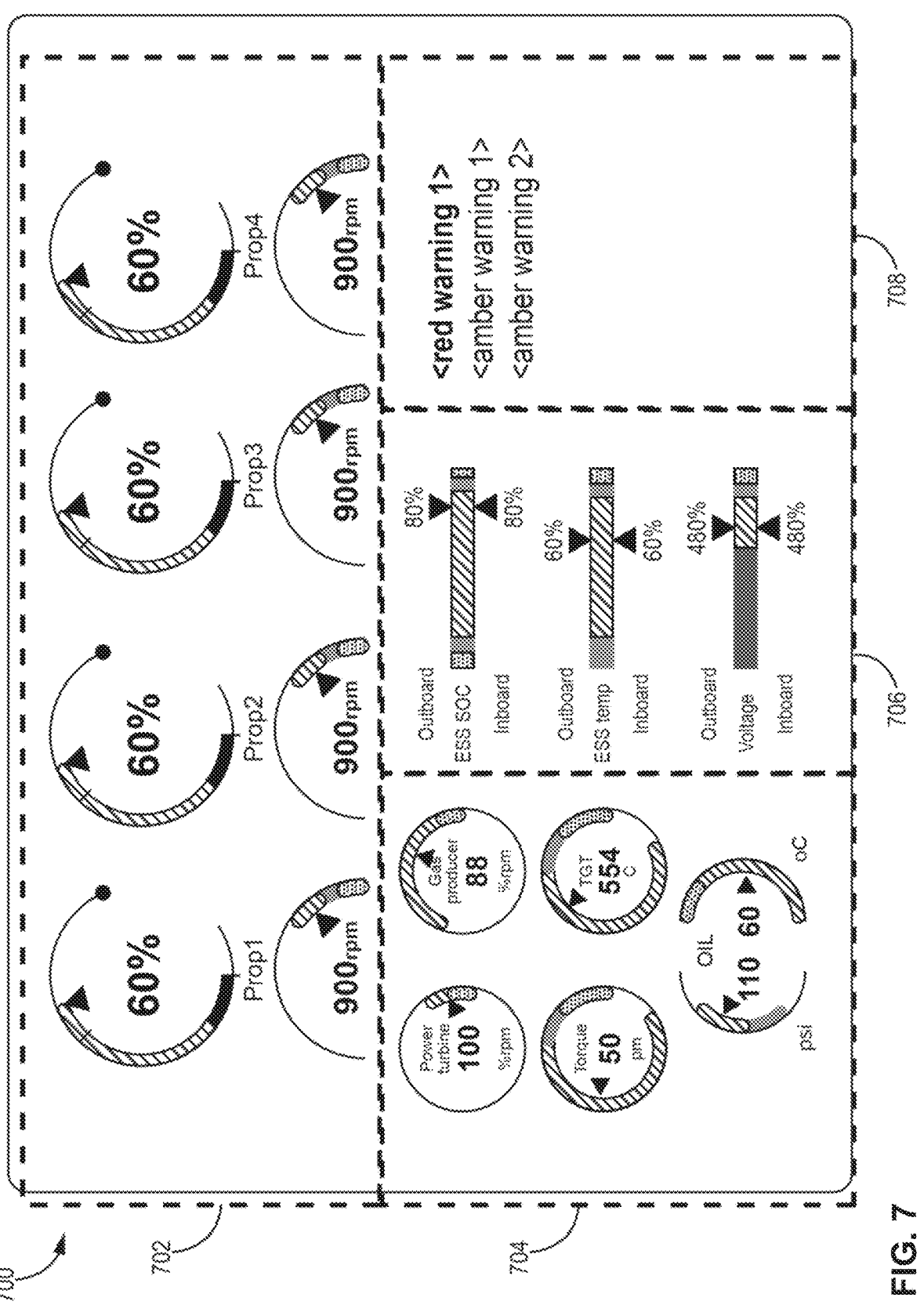
FIG. 7 is a conceptual diagram illustrating a graphical user interface (GUI) with operating state information of components of a hybrid-electric vehicle, in accordance with one or more aspects of this disclosure.

FIG. 7 is a conceptual diagram illustrating a graphical user interface (GUI) with operating state information of component of a hybrid-electric vehicle, in accordance with one or more aspects of this disclosure. GUI 700 of FIG. 7 may be output by a display of a pilot interface, such as display 42 of FIG. 1. Components of GUI 700 be all be output at a single display or may be distributed across multiple displays.

As shown in FIG. 7, GUI 700 may include first region 702 including parameters associated with electric propulsion units (e.g., propulsion units 12 of FIG. 1), second region 704 including parameters associated with a combustion engine (e.g., combustion motor 8 of FIG. 1), third region 706 including parameters associated with ESSs (e.g., ESSs 34 of FIG. 1), and fourth region 708 including messages (e.g., warnings).

As noted above, first region 702 may include parameters associated with electric propulsion units. For instance, first region 702 may include two gauges for each propulsor (e.g., for each of propulsors 16).

The first gauges (e.g., top row of first region 702) may indicate one or more of torque demand, maximum available torque, actual total torque of motor, the portion of DC bus 4 power currently being delivered by power unit (displayed as a fraction of total motor torque), and the portion of DC bus 4 power currently being delivered by ESS (displayed as a fraction of total motor torque). As one example, the numerical value in the first gauges may indicate a percentage of maximum torque (e.g., either maximum sea level ISA torque or maximum at the given flight condition), the triangle may indicate torque demand, the shaded bars (which may be displayed in different colors) may indicate a split of sourced power between ESS and power unit, and the outer arc may indicate a percent of available torque. As such, first region 702 may include a representation of a source of electrical power used by the propulsion units. Further details of the first gauges are discussed below.

As discussed above, pilot interface 40 may output an indication of how long power unit 6 and/or ESS 34 may continue to support operation of propulsion units, e.g. 12 in the maximum non-continuous dual source position (e.g., remaining time), but also applicable at lower throttle settings depending on the split between power unit 6 and ESS 34. In some examples, pilot interface 40 may output such an indication at least in part by flashing or otherwise adjusting (e.g., re-locating and/or re-sizing) the output of the split of sourced power between ESS and power unit in the first gauges.

The second gauges (e.g., bottom row of first region 702) may indicate a current propulsor speed of each of propulsors 16 (e.g., in rpm). Colored arcs may indicate a normal operating range (e.g., a green arc), above normal operating range (e.g., yellow arc), and an overlimit operating range (e.g., a red arc). The second gauges may indicate the propulsor speeds in any combination of graphical and text. For instance, as shown in FIG. 7, the second gauges may include graph and text that both indicate propulsor speed. In some examples, the propulsor speeds indicated may be directly measured at the propulsors. In other examples, such as where the propulsors are connected to their respective electric machines via gear boxes, there may not be direct measurement of propulsor speed. Instead, controller 36 may obtain, and cause display 42 to output, motor speed (e.g., rotational speed of an electric machine) and determine propulsor speed based on a gear ratio and the obtained motor speed. Where the propulsor speeds are displayed in text, the text may change color based on the corresponding arc (e.g., text may be red when the speed is in the red arc).

As noted above, second region 704 may include parameters associated with power unit 6. For instance, where power unit 6 is a gas turbine engine, second region 704 may include indications of power turbine speed, gas producer shaft speeds, torque, turbine temperature, engine oil pressure, and engine oil temperature.

As noted above, third region 706 may include parameters associated with ESSs 34. For instance, third region 706 may include, for each of ESSs 34, indications of state of charge (SOC), temperature, and voltage.

FIGS. 8A-8G are conceptual diagrams illustrating graphical user interfaces (GUIs) of various propulsion module parameters of a hybrid-electric vehicle, in accordance with one or more aspects of this disclosure.

Figure 8A:
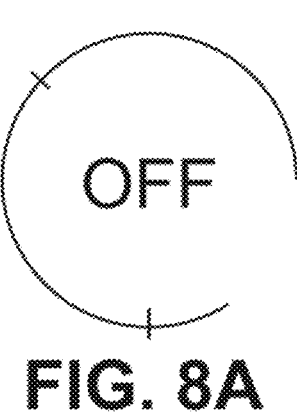
FIGS. 8A-8G are conceptual diagrams illustrating graphical user interfaces (GUIs) of various propulsion module parameters of a hybrid-electric vehicle, in accordance with one or more aspects of this disclosure.

FIG. 8A illustrates an example GUI that may be displayed (e.g., at display 42 in first region 702) for a propulsion module when the propulsion module is off. A GUI such as shown in FIG. 8A may be displayed for a propulsion module where the propulsion module is isolated via a pilot command.

Figure 8B:
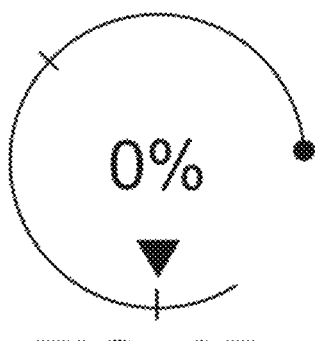

FIG. 8B illustrates an example GUI that may be displayed (e.g., at display 42 in first region 702) for a propulsion module when the propulsion module is on and a corresponding control lever is in an off position. For instance, a GUI such as shown in FIG. 8B may be displayed for propulsion module 12A where control lever 304A is in off position 308. In the example of FIG. 8B, the outer arc indicates that 100% of maximum torque is available.

Figure 8C:
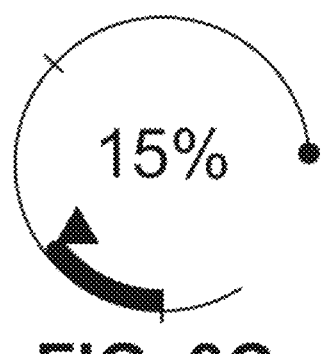

FIG. 8C illustrates an example GUI that may be displayed (e.g., at display 42 in first region 702) for a propulsion module when the propulsion module is on and outputting 15% maximum torque using electrical energy solely sourced from an ESS. For instance, a GUI such as shown in FIG. 8C may be displayed for propulsion module 12A where control lever 304A is between off position 308 and maximum electric only position 310 while battery power share control 330 is set at 100%. In the example of FIG. 8C, the outer arc indicates that 100% of maximum torque is available.

Figure 8D:
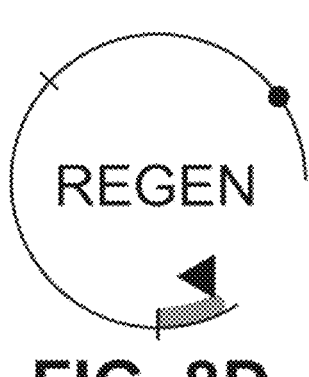

FIG. 8D illustrates an example GUI that may be displayed (e.g., at display 42 in first region 702) for a propulsion module when the propulsion module is operating in a regeneration mode and supplying power (e.g., to charge an ESS). For instance, a GUI such as shown in FIG. 8D may be displayed for propulsion module 12A where control lever 304A is anywhere within regeneration position 306. In the example of FIG. 8D, the outer arc indicates less than 100% of maximum torque is available.

Figure 8E:
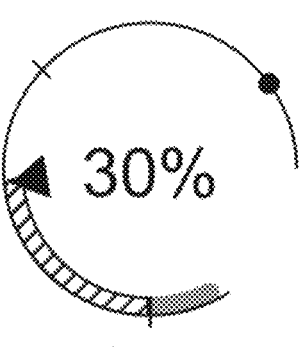

FIG. 8E illustrates an example GUI that may be displayed (e.g., at display 42 in first region 702) for a propulsion module when the propulsion module is on and outputting 30% maximum torque using electrical energy sourced from a power unit while an ESS is charging using electrical energy sourced from the power unit. For instance, a GUI such as shown in FIG. 8E may be displayed for propulsion module 12A where control lever 304A is between off position 308 and maximum continuous dual source position 312 while battery power share control 330 is set at 0%. In the example of FIG. 8E, the outer arc indicates less than 100% of maximum torque is available.

Figure 8F:
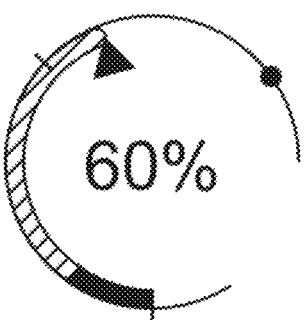

FIG. 8F illustrates an example GUI that may be displayed (e.g., at display 42 in first region 702) for a propulsion module when the propulsion module is on and outputting 60% maximum torque using electrical energy sourced from both a power unit and an ESS. For instance, a GUI such as shown in FIG. 8F may be displayed for propulsion module 12A where control lever 304A is between off position 308 and maximum continuous dual source position 312 while battery power share control 330 is set at a level greater than 0%. In the example of FIG. 8F, the outer arc indicates less than 100% of maximum torque is available.

Figure 8G:
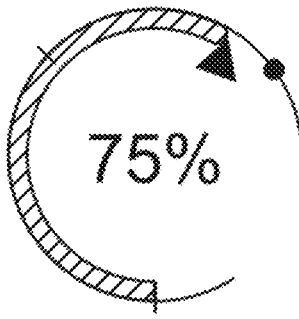

FIG. 8G illustrates an example GUI that may be displayed (e.g., at display 42 in first region 702) for a propulsion module when the propulsion module is on and outputting 75% maximum torque using electrical energy sourced from a power unit (without an ESS charging or discharging). For instance, a GUI such as shown in FIG. 8G may be displayed for propulsion module 12A where control lever 304A is between off position 308 and maximum continuous dual source position 312 while battery power share control 330 is set to 0%. In the example of FIG. 8G, the outer arc indicates that 75% of maximum torque is available. As the outer arc indicates the same torque availability level as is being output by the propulsion unit, a pilot may quickly determine that no additional torque is available from the propulsion module.

Various examples have been described. These and other examples are within the scope of the following claims.

What is claimed is:

1. An airframe comprising:
   a plurality of electrical propulsion units configured to propel, via respective propulsors, the airframe using electrical energy sourced from an electrical energy storage system (ESS) and/or one or more electrical generators, the one or more electrical generators configured to operate using fuel;
   a display; and
   one or more processors configured to output, for display at the display, a graphical user interface (GUI) that indicates a respective operating state of each respective electrical propulsion unit of the plurality of electrical propulsion units, wherein the indication of the operating state indicates, for each respective electrical propulsion unit:
      a respective amount of torque provided by the respective electrical propulsion unit, and
      a respective representation of a source of electrical power used by the respective electrical propulsion unit to provide the respective amount of torque, wherein the representation of the source of electrical power indicates an amount of electrical power sourced by the respective electrical propulsion unit from the one or more electrical generators relative to an amount of electrical power sourced by the respective electrical propulsion unit from the ESS.

2. The airframe of claim 1, wherein the one or more processors are further configured to output, for display at the display, a GUI that indicates an operating state of the ESS and an operating state of the one or more electrical generators.

3. The airframe of claim 1, wherein the representation of the source of electrical power for a particular electrical propulsion unit of the plurality of electrical propulsion units comprises a bar having a total size that represents the amount of torque provided by the particular electrical propulsion unit, a first portion of the bar represents the amount of electrical power sourced from the one or more electrical generators by the particular electrical propulsion unit, a second portion of the bar represents the amount of electrical power sourced from the ESS by the particular electrical propulsion unit, the first portion having a different visual appearance than the second portion.

4. The airframe of claim 1, wherein the ESS is configured to charge using electrical power generated by one or both of the plurality of electrical propulsion units and the one or more electrical generators, and wherein the representation of the source of electrical power indicates whether the ESS is charging.

5. The airframe of claim 4, wherein, when the ESS is charging using electrical power generated by the plurality of electrical propulsion units, the GUI indicates a negative amount of torque provided by the respective electrical propulsion unit.

6. The airframe of claim 1, wherein the GUI further indicates a maximum amount of torque available to the respective electrical propulsion unit.

7. The airframe of claim 1, wherein the maximum amount of torque available to a particular electrical propulsion unit of the plurality of electrical propulsion units is different than the amount of torque provided by the particular electrical propulsion unit.

8. A system comprising a plurality of electrical propulsion units configured to propel an airframe using electrical energy sourced from an electrical energy storage system (ESS) and/or one or more electrical generators that operate using fuel, the system further comprising:
   a display; and
   one or more processors configured to output, for display at the display, a graphical user interface (GUI) that indicates a respective operating state of each respective electrical propulsion unit of the plurality of electrical propulsion units, wherein the indication of the operating state indicates, for each respective electrical propulsion unit:
      a respective amount of torque provided by the respective electrical propulsion unit, and
      a respective representation of a source of electrical power used by the respective electrical propulsion unit, wherein the respective representation of the source of electrical power indicates an amount of electrical power sourced by the respective electrical propulsion unit from the one or more electrical generators relative to an amount of electrical power sourced by the respective electrical propulsion unit from the ESS.

9. The airframe of claim 8, wherein the one or more processors are further configured to output, for display at the display, a GUI that indicates an operating state of the ESS and an operating state of the one or more electrical generators.

10. The airframe of claim 8, wherein the representation of the source of electrical power for a particular electrical propulsion unit of the plurality of electrical propulsion units comprises a bar having a total size that represents the amount of torque provided by the particular electrical propulsion unit, a first portion of the bar represents the amount of electrical power sourced from the one or more electrical generators by the particular electrical propulsion unit, a second portion of the bar represents the amount of electrical power sourced from the ESS by the particular electrical propulsion unit, the first portion having a different visual appearance than the second portion.

11. The airframe of claim 8, wherein the ESS is configured to charge using electrical power generated by one or both of the plurality of electrical propulsion units and the one or more electrical generators, and wherein the representation of the source of electrical power indicates whether the ESS is charging.

12. The airframe of claim 11, wherein, when the ESS is charging using electrical power generated by the plurality of electrical propulsion units, the GUI indicates a negative amount of torque provided by the respective electrical propulsion unit.

13. The airframe of claim 8, wherein the GUI further indicates a maximum amount of torque available to the respective electrical propulsion unit.

14. The airframe of claim 8, wherein the maximum amount of torque available to a particular electrical propulsion unit of the plurality of electrical propulsion units is different than the amount of torque provided by the particular electrical propulsion unit.

15. A non-transitory computer-readable storage medium storing instructions that, when executed, cause one or more processors of an aircraft to:

control a plurality of electrical propulsion units of the aircraft to propel, via respective propulsors, the aircraft using electrical energy sourced from an electrical energy storage system (ESS) and/or one or more electrical generators, the one or more electrical generators configured to operate using fuel; and output, for display, a graphical user interface (GUI) that indicates a respective operating state of each respective electrical propulsion unit of the plurality of electrical propulsion units, wherein the indication of the operating state indicates, for each respective electrical propulsion unit:

a respective amount of torque provided by the respective electrical propulsion unit, and a respective representation of a source of electrical power used by the respective electrical propulsion unit to provide the respective amount of torque, wherein the respective representation of the source of electrical power indicates an amount of electrical power sourced by the respective electrical propulsion unit from the one or more electrical generators relative to an amount of electrical power sourced by the respective electrical propulsion unit from the ESS.

\*  \*  \*  \*  \*